3,350,790
TEMPERATURE CONTROL SYSTEM FOR
ROTARY DRYERS
Travis S. Whitsel, Jr., Houston, Tex., assignor to Ashland
Oil & Refining Company, Houston, Tex., a corporation
of Kentucky
Filed July 12, 1965, Ser. No. 470,962
19 Claims. (Cl. 34—31)

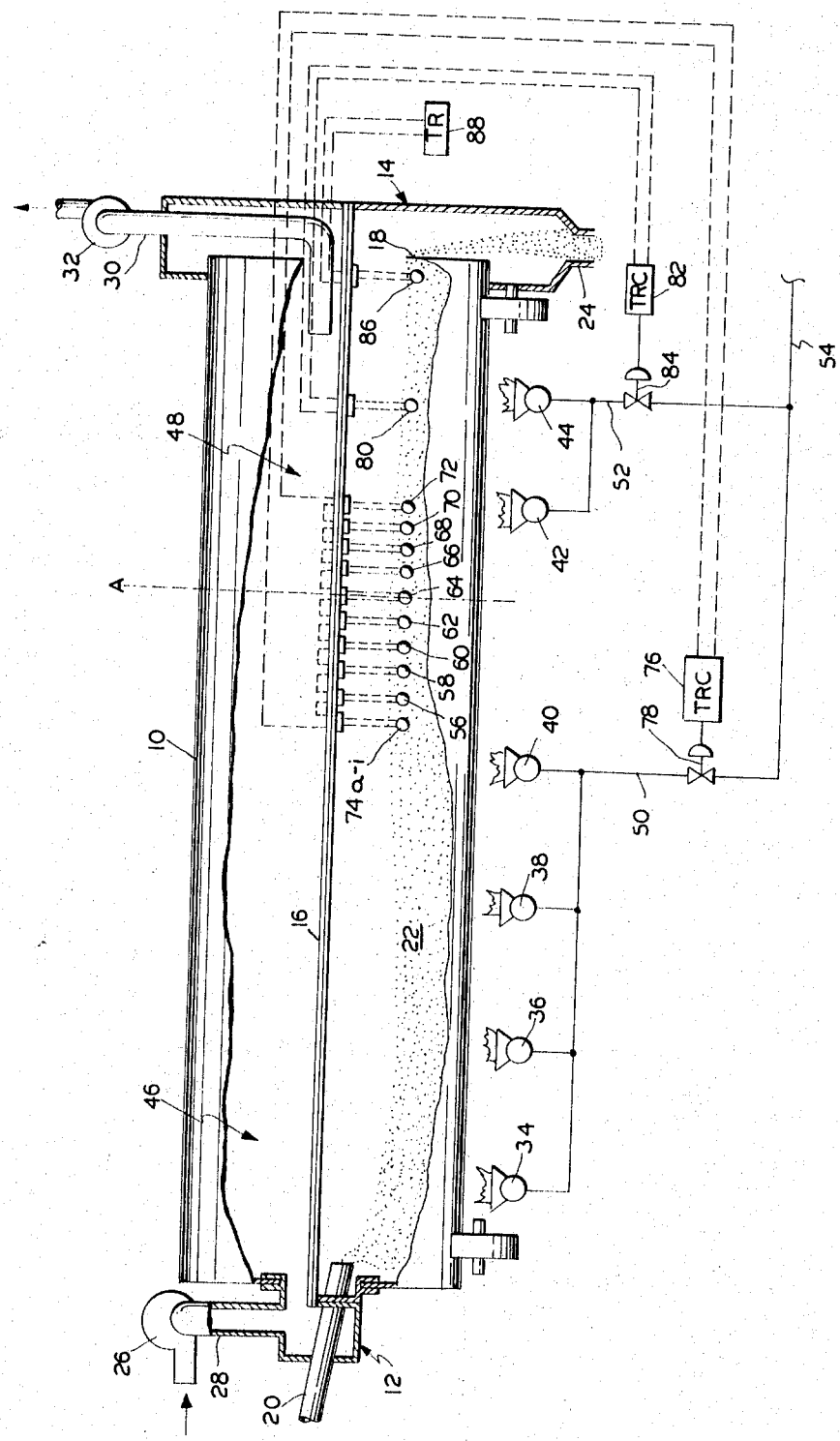

The present invention relates to a method and apparatus for control of the temperature of a drying system. In a more specific aspect, the present invention relates to a temperature control system for use in a rotary dryer wherein granular materials, such as carbon black pallets are dried.

Rotary dryers are well know for the drying of granular material and particularly in the drying of carbon black. In the manfacture of carbon black powdery carbon black is agglomerated into small pellets to reduce dust problems and facilitate handling. A widely practiced method for making pellets involves mixing the dry powdery carbon black with about half its weight of water. Proper agitation results in the formation of lead-shot-size wet pellets which must be dried to a moisture content of roughly 0.1 to 1.0% before they can be economically packaged and shipped. Carbon black manufacturers customarily treat a continuous stream of such wet pellets in a variety of drying systems. The type of dryer that has been the most popular for some years is the rotary dryer which somewhat resembles a rotary cement kiln.

The most common type of rotary dryer was a drum defining a chamber through which the wet pellets flow as the drum rotates. The drum is generally inclined somewhat so that the tumbling pellets flow from the inlet or upstream end toward the outlet or downstream end and overflow over a dyke or barrier at the downstream end. Burners, usually gas fired, direct hot combustion gases against the exterior of the drum and heat the flowing bed of pellets indirectly. It is also customary to introduce hot purge gases or hot combustion gases through the space in the drum above the bed of wet pellets to remove the water vapor as it is evaporated from the pellets.

One of the usual methods of controlling the firing of a rotary dryer is to determine the outlet product temperature and to regulate the fuel supply from a common fuel supply line to all of the burners in proportion to that temperature. Since the dryer usually demands more heat at the inlet end, this demand is usually filled by placing more burners at the feed inlet end. This method of control is far from satisfactory since the temperature sensed at the outlet end is obtained after a substantial time lag equal to the time required for the granular material to traverse the entire length of the dryer. In addition, the pellets do not flow through the dryer in the same distinct bodies or slugs as they were introduced but spread out through a considerable length dryer. Accordingly, there is little or no adequate control of the temperature with one direct such temperature only as an afterthought at the end of the dryer. The obvious defect of this type of control becomes much more prevalent when attempts are made to control the heat required at the inlet end where the vast majority of the drying takes place, and particularly when the moisture content of the pellets increase substantially over normal feed materials.

In addition to the temperature measuring instrument at the outlet end of the dryer attempts have also been made to control the temperature at the inlet end of the dryer by measuring the moisture content or the rate of water input to the dryer. In actual practice, this is usually a manual control adjusted by the operator in conformance with variations in the water input to the mixers which precede the dryer. There is considerable validity to a control such as this since the B.t.u. input is varied in conformity with the water input. However, as used in present day dryers, it regulates the B.t.u. input throughout the whole dryer. Actually, it should govern only the input in the very front portion of the dryer, where over 90% of the water is evaporated from the pellets.

More recently, a method and apparatus, to control the temperature of the dryer more adequately, has been set forth in co-pending application, Ser. No. 155,026, filed Nov. 27, 1961, by the present inventor and entitled "Temperature Control System for Rotary Dryers." The present application is a continuation-in-part of said application. In accordance with the subject co-pending application, applicant became aware of the fact that the drying of pellets goes through three phases marked by certain temperature phenomena and drying kinetics, which will now be explained. In the first phase, the pellets just charged into the dryer begin to heat up from ambient temperature toward a substantially constant temperature. The attainment of the constant temperature marks the beginning of the second phase, which is referred to as the "constant rate period." The pellets must travel a certain average distance through the dryer and, as a consequence, absorb a certain minimum amount of heat before attaining the aforesaid constant temperature which marks the beginning of the constant rate period. During the constant rate period, water is evaporated from the surface of the pellets and the rate of diffusion of the water to the surface of the pellet is equal to or greater than the rate of evaporation. Accordingly, the temperature of the pellet surface will not exceed the dew point of the atmosphere surrounding the pellets or the temperature at which the water is evaporating. Eventually, there comes a point of time in a drying process when the rate of diffusion of the water to the surface of the pellet is less than the rate of evaporation. This is the beginning of what is termed the "falling rate period." As the moisture content continues to decrease, so does the rate of diffusion; consequently the rate of evaporation decreases in proportion. The lack of adequate moisture to saturate the surface of the pellet allows the pellet temperature to increase from the surface inwardly and to thereby dry in the process. Finally, a point is reached at which evaporation takes place to bone dryness, wherein the last molecule of water is evaporated from the interior of the pellet. This falling rate period is therefore marked by a substantial increase in the temperature surrounding the pellets and thus in the pellet bed. Accordingly, if one measures the temperature throughout the length of the dryer the temperature will sharply increase from ambient temperature up to the dew point temperature. The temperature will then remain at substantially the dew point temperature until the rate of evaporation exceeds the rate of diffusion through the pellets. At this point another sharp temperature rise takes place, in a substantially linear fashion, until the maximum outlet temperature is reached, at which point the pellets are dried to the previously mentioned moisture content. In accordance with the said prior application, it was determined that the point of inflection of the dryer temperature curve or the point where the evaporation rate changes from a constant rate to a falling rate is the critical point for the control of heat to the dryer and best results can be obtained by measuring the temperature and determining the location of this point. In short, by spanning this point, or the predetermined section of dryer length in which this inflection is expected, with temperature measuring devices and utilizing the detected information for controlling fuel to the burners, the point at which the deflection took place could be maintained essentially constant and the dryer adequately controlled.

More specifically, in the system of the prior patent application, a plurality of thermocouples or thermocouple junctions are spaced in and along the dryer over a distance sufficient to cover the contemplated span or length of the dryer within which the temperature inflection point or change from constant to falling evaporation rate occurs. These thermocouples are equally spaced from one another within this range if more than two are employed. The thermocouples are connected to one another in series addition so that a total voltage is measured by an external temperature recorder controller. This total temperature will of course vary with the position of the inflection point or temperature change. For example, if the inflection point is closer to the upstream or inlet end, than desired, the measured voltage will increase over a predetermined value, whereas, if this point has shifted toward the downstream or outlet end, the total voltage measured for all of the thermocouples decreases. Accordingly, by connecting the temperature recorder controller to a valve at the inlet of the burners the flow of fuel to the burners can be adjusted to thereby increase or decrease the temperature as dictated by the measurements made. While this system provides a substantial improvement over the prior art in the control of dryer temperatures, it is not completely adequate and leaves a great deal to be desired. Accordingly, additional experimental evidence has shown that this temperature control alone is not wholly adequate and must be supplemented. More specifically, it was found that not only control at the point of this inflection was necessary but also that control during the falling rate period or period of temperature increase is also necessary. In addition, it was found that simply totalling the measured voltages of the plurality of thermocouples did not adequately locate and represent the maximum voltage variation in the range spanned by the thermocouples.

It is therefore an object of the present invention to provide an improved method and apparatus for control of the temperature in a rotary dryer. A more specific object of the present invention is to provide an improved method and apparatus for controlling the temperature and the position along the length of a dryer where a constant rate of evaporation rapidly changes to a falling rate of evaporation. Another and further object of the present invention is to provide an improved method and apparatus for the control of the temperature in a rotary dryer system wherein improved sensitivity of detection is obtained. Yet another object of the present invention is to provide an improved method and apparatus for detecting the temperature and the position along the length of a dryer at which a constant rate of evaporation rapidly changes to a falling rate of evaporation, which method and apparatus is extremely sensitive to the position and magnitude of this change. A still further object of the present invention is to provide an improved method and apparatus for the control of the temperature in a rotary dryer wherein the temperature is controlled both at the point where the rate of evaporation begins to fall rapidly and during the falling rate period. A still further object of the present invention is to provide an improved method and apparatus for the control of the temperature in a dryer wherein the temperature of and the location of the point where the rate of evaporation begins to fall rapidly is controlled by a plurality of temperature sensing elements spanning this point or a predetermined distance along the length of the dryer within which this point is expected to be. Yet another object of the present invention is to provide an improved method and apparatus for controlling the temperature in a rotary dryer in which a plurality of temperature sensing elements span a predetermined point along the length of the dryer at which the rate of evaporation begins to rapidly fall and these measurements are added and measured in opposition to the temperatures sensed by an equal number of similar sensing elements located adjacent the first or upstream one of the first set of detecting elements. Another and further object of the present invention is to provide an improved method and apparatus for the control of the temperature in a rotary dryer wherein a plurality of temperature sensing elements are utilized to control the temperature at the point in the dryer where a constant rate of evaporation rapidly changes to a falling rate of evaporation and this detected temperature is utilized to control a first series of burners which provide heat for the zone of constant evaporation rate. A still further object of the present invention is to provide an improved method and apparatus for control of the temperature in a rotary dryer wherein the temperature is detected at the point where a constant rate of evaporation rapidly changes to a falling rate of evaporation and the detected temperature is utilized to control the temperature throughout the zone of consant evaporation rate by automatically adjusting a first series of heating units and the temperature is also detected at a point in the falling rate of evaporation zone and the detected temperature in this zone is utilized to control a second series of heating elements which supply heat to the zone of falling evaporation rate. These and other objects of the present invention will become apparent from the following detailed description when read in conjunction with the drawing wherein the figure shows schematically and partially in section a rotary drum type dryer constructed in accordance with the present invention and adapted to carry out the present method.

In accordance with the present invention, it has surprisingly been found that the above objectives can be attained by providing a sensitive measurement of the temperature and the position along the length of a rotary dryer at which a constant rate of evaporation rapidly changes to a falling rate of evaporation, and providing means for control of the rate of drying during the period of the falling rate of evaporation. By this means, not only can the moisture content of a dried material, such as carbon black, be accurately controlled from one batch to another; but, by proper adjustment of the position at which the rate of evaporation begins to fall and the rate of temperature increase throughout the falling rate of evaporation period, it is possible to accurately control the character and properties of the carbon black produced by the dryer.

The temperature profile in a carbon black dryer is characterized by a rather rapid and straight line increase in temperature from ambient temperature to the dew point temperature. During the period at which the evaporation is substantially constant, the temperature is generally substantially constant since the rate of evaporation is equal to or exceeds the rate of diffusion of moisture from the center of the particles to their surface. However, once the rate of evaporation exceeds the rate at which moisture is transmitted from the centers of the particles to their exteriors, evaporation is less rapid and this rate of evaporation generally is a straight line function. Consequently, the temperature also begins a rapid, straight-line increase from this point in the dryer to the end of the dryer. By adjusting the heat during the constant rate of evaporation portion of the cycle near the beginning of the dryer operation, one can adequately control both the point at which the break in the temperature curve occurs as well as the temperature at this point. In addition, by adequately controlling the rate of temperature increase during the increasing temperature period, or the slope of the increasing temperature line, it is possible to control the character and the moisture content of the carbon black discharge from the dryer. It has been found in accordance with the present invention that the break in the temperature curve, or the point at which the temperature begins to rapidly rise, is generally located about two-thirds of the way through the dryer. In other words, it has been found that the constant rate zone of evaporation covers substantially the first two-thirds of the dryer length while the falling rate zone of evaporation covers substantially the length of the last one-third of the dryer. This break point in the temperature curve generally varies from a temperature of 170° to 200° F. depending upon the rate of B.t.u. input to the first portion of the dryer and possibly on the ease with which the carbon black releases moisture. With high rates of B.t.u. input, the temperature at which the temperature break occurs may be as high as 250° F. or higher. As previously indicated, the point at which the break in the temperature curve occurs can be shifted downstream or toward the downstream or discharge end by a low rate of B.t.u. input in the first portion of the dryer cycle, with other conditions remaining unchanged, and this point can be shifted to the upstream or intake end of the dryer by increasing the B.t.u. input to the first portion of the dryer cycle.

The details of the method and apparatus of the present invention will now be explained with reference to the drawing. In accordance with the drawing the dryer comprises a rotatable drum 10 having an inlet or upstream end 12, and a discharge or downstream end 14. Drum 10 is, for example, 5½ to 7 feet in diameter and 52 to 60 feet in length. The rotary drum is mounted to rotate about shaft 16 and inlet end 12 and within discharge end 14 of the dryer system. As previously indicated, the dryer shell or drum is generally inclined slightly from the inlet end to the discharge end so that while the drum is rotating the pelletized carbon black will flow toward the discharge end and eventually overflow over the dyke formed by the interior edge 18 of the end of the drum. The pipe 20 introduces wet carbon black pellets from a suitable source, not shown, to the dryer where these pellets form a body of pellets 22 flowing along the length of the dryer and eventually overflowing over dyke 18 into discharge pipe 24 at the discharge end 14 of the dryer. Also, introduced into inlet end 12 through duct 28 and flowing parallel to the flow of pellets through drum 10 are hot purge or combustion gases which are introduced from a suitable source, not shown, by blower 26. The hot combustion gases flow in the same general direction as the pellets and above the bed of pellets carrying away the moisture evaporated from the pellets. The purge gas is then discharged from the discharge end 14 through duct 30 and thence to the atmosphere or to another mechanism which may utilize this same gas. Located on pipe 30 is a suitable coupling 32. Heat is supplied to the exterior of drum 10 by a first series of burners 34, 36, 38, and 40. Burners 34 through 40, as will be hereinafter pointed out, heat the inlet end or first two-thirds of the dryer length. A second series of burners 42 and 44 heat the latter one-third or the discharge end of the dryer. The dryer, therefore, may be divided into two substantially distinct zones, namely, a constant rate of evaporation zone, located adjacent the inlet end and represented by the numeral 46, and a declining rate of evaporation zone located at the terminal end of the dryer and represented by the numeral 48. As previously indicated, this line of demarcation generally divides the front or inlet two-thirds of the dryer from the discharge or outlet one-third of the dryer and in the drawing the two zones are separated by the arbitrary dashed line indicated as line A. Also as shown by the drawing, the burners in the first two-thirds or the constant rate zone are supplied with fuel by fuel supply line 50 while the burners 42 and 44 in the last one-third or falling rate zone are supplied by fuel line 52. Lines 52 and 50 are in turn supplied with fuel from an external source, not shown, through common line 54. Thus, it may be seen that two separate and distinct burner systems supply heat to the two separate and distinct zones of the dryer and this in part permits the highly effective and efficient control of the moisture, quality and character of carbon black produced in accordance with the present method and apparatus of the present invention. As previously taught in the parent application, at least two thermocoupled junctions are made to span the dividing line A between the constant rate zone and the falling rate zone. By coupling these thermocouples in series addition a total or additive voltage proportional to the additive temperature can be measured and any change in this temperature can be utilized to control the heat supplied to the dryer. If, for example, the temperature break in the drying curve, or the point at which the constant rate changes to a falling rate of evaporation, should shift to the left of line A, the controller would then supply additional heat to the dryer and thereby shift the point toward the discharge end and closer to line A. By the same token, if the temperature break has shifted to the right of line A, the heat to the dryer would be reduced to shift this point back to line A. As shown in the present drawing this is accomplished by disposing a plurality of thermocouples 56, 58, 60, 62, 64, 66, 68, 70, and 72 along a dryer section approximately eight to ten feet long spanning line A. Specifically, in accordance with the drawing, thermocouples 56 through 72 are spaced one foot apart and thus span a distance of eight feet. While this temperature detection system will, as indicated, permit one to control the temperature much better than had previously been possible, it has been found that the temperature measurement is not as sensitive as it should be. Accordingly, a more sensitive and highly accurate system can be provided by placing an equal number of thermocouples joints 74a through 74i adjacent to, or as close as possible to, the first or upstream thermocouple 56. Thus, thermocouples 74a to i are equal in number to thermocouples 56 through 72 and are also connected in series addition. By then connecting thermocouples 56 through 72 and thermocouples 74a to i in series opposition a differential measurement can be obtained which is extremely accurate both in locating the point A as well as indicating the magnitude of any variation from a predetermined or normal measurement. This differential temperature is then fed to temperature recorder controller 76 where it is used to control valve 78 in fuel supply line 50 to burners 34 through 40. It is to be observed that a separate and distinct control is thus provided for the first two-thirds, or the constant rate portion, of the drying cycle, which is distinct from the control of the last one-third or falling rate portion of the cycle. The temperature in the falling rate of evaporation zone, or zone following point A, is then detected by at least one thermocouple 80 spaced approximately four to five feet downstream, or toward the discharge end of the dryer from the last of the thermocouples 72. This thermocouple 80 measures the temperature at a single point along a straight line or inclined temperature line and may be utilized to accurately control the slope of the temperature or evaporation curve from point A to the end of the dryer. This is done by utilizing the voltage produced by thermocouple 80 to operate temperature controller 82 which, in turn, operates valve 84. Valve 84 is placed in fuel supply line 52 to burners 42 and 44 thus permitting one to control the falling rate portion of the drying cycle separately from that of the first portion of the cycle. If the slope of a temperature curve is below that considered necessary to the production of a given product, the heat will be increased; and, if above, the heat will be decreased. As previously indicated, this has a distinct effect on the character of the carbon black produced as well as its quality and moisture content. Also, as shown in the drawing, yet another thermocouple 86 can be mounted in the bed of carbon black just inside dyke 18, which measures the temperature at the end of the dryer in a conventional manner and records this temperature by means of temperature recorder 88. All of the thermocouples are appropriately mounted within drum 10 so that they will always be in the bed of carbon black as the drum rotates and about 4 to 5 inches away from the inside wall of the drum.

I claim:

1. A method of controlling the rate of evaporation of moisture from a particle-form carbon black comprising: continuously flowing an elongated bed of said carbon black along a substantially horizontal path; heating substantially the entire length of said bed to evaporate moisture from said bed; measuring the temperature of said bed at a plurality of first points in said bed, spaced along said bed and spanning a predetermined first location along said bed at which a constant rate of evaporation from said bed changes to a falling rate of evaporation; adding the measured temperatures at said plurality of first points to obtain a first sum of said measured temperatures; measuring the temperature at an equal number of second points, at a second substantially single-point location adjacent the most upstream one of said plurality of first points; adding the measured temperatures at said plurality of second points to obtain a second sum of said measured temperatures; subtracting said second sum of said measured temperatures from said first sum of said measured temperatures to obtain a differential value of temperature; comparing said differential value of temperature with a first predetermined value of temperature; adjusting the heat to the portion of said bed upstream of said predetermined first location in accordance with the variance of said differential value of temperature from said first predetermined value of temperature; measuring the temperature in said bed at a third location, longitudinally displaced downstream from said first location and from the most downstream one of said plurality of first points; comparing the temperature measured at said third location with a second predetermined value of temperature; and adjusting the heat to the portion of said bed downstream of said first location in accordance with the variance of the temperature measured at said third location from said second predetermined value of temperature.

2. A method of controlling the rate of evaporation of moisture from a particle-form solid material comprising: continuously flowing an elongated bed of said particle-form solid along a substantially horizontal path; heating substantially the entire length of said bed to evaporate moisture from said bed; measuring a parameter proportional to the rate of evaporation of moisture from said bed at a plurality of first points in said bed, spaced along said bed and spanning a predetermined first location along said bed at which a constant rate of evaporation from said bed changes to a falling rate of evaporation; adding the measured parameters at said plurality of first points to obtain a first sum of said measured parameters; measuring said parameter at an equal number of second points, at a second substantially single-point location adjacent the most upstream one of said plurality of first points; adding the measured parameters at said plurality of second points to obtain a second sum of said measured parameters; subtracting said second sum of said measured parameters from said first sum of said measured parameters to obtain a differential value of said parameter; comparing said differential value of said parameter with a first predetermined value of said parameter; adjusting the heat to the portion of said bed upstream of said predetermined first location in accordance with the variance of said differential value of said parameter from said first predetermined value of said parameter; measuring said parameter in said bed at a third location, longitudinally displaced downstream from said first location and from the most downstream one of said plurality of first points; comparing the parameter measured at said third location with a second predetermined value of said parameter; and adjusting the heat to the portion of said bed downstream of said first location in accordance with the variance of the parameter measured at said third location from said second predetermined value of said parameter.

3. A method of controlling the rate of evaporation of moisture from a particle-form solid material comprising: continuously flowing an elongated bed of said paricleform solid along a substantially horizontal path; heating substantially the entire length of said bed to evaporate moisture from said bed; measuring a parameter proportional to the rate of evaporation of moisture from said bed at a plurality of first points in said bed, spaced along said bed and spanning a predetermined first location along said bed at which a constant rate of evaporation from said bed changes to a falling rate of evaporation; adding the measured parameters at said plurality of first points to obtain a first sum of said measured parameters, measuring said parameter at an equal number of second points, at a second substantially single-point location adjacent the most upstream one of said plurality of first points; adding the measured parameters at said plurality of second points to obtain a second sum of said measured parameters; subtracting said second sum of said measured parameters from said first sum of said measured parameters to obtain a differential value of said parameter; comparing said differential value of said parameter with a first predetermined value of said parameter; and adjusting the heat to at least that portion of said bed, which is upstream of said predetermined first location, in accordance with the variance of said differential value of said parameter from said first predetermined value of said parameter.

4. A method of controlling the rate of evaporation of moisture from a particle-form solid material comprising: continuously flowing an elongated bed of said particle-form solid along a substantially horizontal path; heating substantially the entire length of said bed to evaporate moisture from said bed; measuring a parameter proportional to the rate of evaporation of moisture from said bed at at least one point in said bed, longitudinally displaced downstream from a predetermined location along said bed at which a constant rate of evaporation from said bed changes to a falling rate of evaporation; comparing the parameter measured at said point with a predetermined value of said parameter; and adjusting the heat to at least that portion of said bed, which is downstream of said location in accordance with the variance of the parameter measured at said point from said predetermined value of said parameter.

5. A method of controlling the rate of evaporation of moisture from a particle-form solid material comprising: continuously flowing an elongated bed of said particle-form solid along a substantially horizontal path; heating substantially the entire length of said bed to evaporate moisture from said bed; measuring a parameter proportional to the rate of evaporation of moisture from said bed at at least one first point along said bed at a predetermined first location along said bed at which a constant rate of evaporation from said bed changes to a falling rate of evaporation; comparing the measured parameter at said first point with a first predetermined value of said parameter; adjusting the heat to the portion of said bed upstream of said predetermined first location in accordance with the variance of said measured parameter at said first point from said first predetermined value of said parameter; measuring said parameter in said bed at a second location, longitudinally displaced downstream from said first location; comparing the parameter measured at said second location with a second predetermined value of said parameter; and adjusting the heat to the portion of said bed downstream of said first location in accordance with the variance of the parameter measured at said second location from said second predetermined value of said parameter.

6. A method in accordance with claim 5 wherein the moisture content of the bed at the downstream end is between about 0.1 and 1.0%.

7. A method in accordance with claim 5 wherein the temperature at the predetermined first location along the bed is maintained between about 170° and 250° F.

8. A method in accordance with claim 5 wherein the predetermined first location is about two-thirds of the length of the bed from the upstream end of said bed.

9. A method in accordance with claim 5 wherein the second location is about four to five feet downstream from the first location.

10. A method in accordance with claim 5 wherein the measured parameter is temperature.

11. A dryer system comprising: an elongated chamber having an inlet and an outlet and adapted to contain a flowing bed of particle-form solid material; first burner means operatively associated with said chamber and adapted to heat the upstream portion of said chamber; second burner means operatively associated with said chamber and adapted to heat the downstream portion of said chamber; first fuel supply line means operatively connected to said first burner; second fuel supply line means operatively connected to said second burner; a plurality of first temperature sensing means mounted within said chamber at spaced points along said chamber and spanning the dividing line between said upstream and downstream portions of said chamber; said first temperature sensing means being electrically connected to produce a first signal representative of the sum of the temperatures sensed by said first temperature sensing means; a plurality of second temperature sensing means, equal in number to the number of said first temperature sensing means, mounted in said chamber at a substantially single-point location adjacent the most upstream one of said first temperature sensing means; said second temperature sensing means being electrically connected to produce a second signal representative of the sum of the temperatures sensed by said second temperature sensing means; said first and second temperature sensing means also being electrically connected to produce a third signal representative of the difference between said first and second signals; third temperature sensing means mounted in said chamber at a point downstream from the most downstream one of said first temperature sensing means; first valve means mounted in said first fuel line and adapted to vary the flow of fuel to said first burner; first controller means operatively connected to said first valve and adapted to open and close said first valve in response to the variance of said third signal from a first predetermined signal; second valve means mounted in said second fuel line and adapted to vary the flow of fuel to said second burner; and second controller means operatively connected to said second valve and adapted to open and close said second valve in response to the variance of the signal produced by said third temperature sensing means from a second predetermined signal.

12. A dryer system comprising: an elongated chamber having an inlet and an outlet and adapted to contain a flowing bed of particle-form solid material; first burner means operatively associated with said chamber and adapted to heat the upstream portion of said chamber; second burner means operatively associated with said chamber and adapted to heat the downstream portion of said chamber; first fuel supply line means operatively connected to said first burner; second fuel supply line means operatively connected to said second burner; a plurality of first thermocouples mounted within said chamber at spaced points along said chamber and spanning the dividing line between said upstream and said downstream portions of said chamber; said first thermocouples being electrically connected in series addition to produce a first signal representative of the sum of the voltages generated by said first thermocouples; a plurality of second thermocouples, equal in number to the number of said first thermocouples, mounted in said chamber at a substantially single-point location adjacent the most upstream one of said first thermocouples; said second thermocouples being electrically connected in series addition to produce a second signal representative of the sum of the voltages generated by said second thermocouples; said first and second thermocouples also being electrically connected in series opposition to produce a third signal representative of the difference between said first and second signals; a third thermocouple mounted in said chamber at a point downstream from the most downstream one of said first thermocouples; first valve means mounted in said first fuel line and adapted to vary the flow of fuel to said first burner; first controller means operatively connected to said first valve and adapted to open and close said first valve in response to the variance of said third signal from a first predetermined signal; second valve means mounted in said second fuel line and adapted to vary the flow of fuel to said second burner; and second controller means operatively connected to said valve and adapted to open and close said second valve in response to the variance of the signal produced by said third thermocouple from a second predetermined signal.

13. A system in accordance with claim 12 wherein the first thermocouples are about one foot from one another.

14. A system in accordance with claim 12 wherein the first thermocouples span a point about two-thirds of the length of the chamber from the inlet.

15. A system in accordance with claim 12 wherein the third thermocouple is located about four to five feet downstream from the most downstream one of the first thermocouples.

16. A dryer system comprising: an elongated chamber having an inlet and an outlet and adapted to contain a flowing bed of particle-form solid material; burner means operatively associated with said chamber and adapted to heat said chamber; fuel supply line means operatively connected to said burner; a plurality of first thermocouples mounted within said chamber at spaced points along said chamber; said first thermocouples being electrically connected in series addition to produce a first signal representative of the sum of the voltages generated by said first thermocouples; a plurality of second thermocouples, equal in number to the number of said first thermocouples, mounted in said chamber at a substantially single-point location adjacent the most upstream one of said first thermocouples; said second thermocouples being electrically connected in series addition to produce a second signal representative of the sum of the voltages generated by said second thermocouples; said first and second thermocouples also being electrically connected in series opposition to produce a third signal representative of the difference between said first and second signals; valve means mounted in said fuel line and adapted to vary the flow of fuel to said burner; and controller means operatively connected to said valve and adapted to open and close said valve in response to the variance of said third signal from a first predetermined signal.

17. A dryer system comprising: an elongated chamber having an inlet and an outlet and adapted to contain a flowing bed of particle-form solid material; first burner means operatively associated with said chamber and adapted to heat the upstream portion of said chamber; second burner means operatively associated with said chamber and adapted to heat the downstream portion of said chamber; first fuel supply line means operatively connected to said first burner; second fuel supply line means operatively connected to said second burner; first thermocouple means mounted within said chamber, at the dividing line between said upstream and said downstream portions of said chamber; said dividing line representing a location in said dryer at which a constant rate of moisture evaporation changes to a falling rate of moisture evaporation; second thermocouple means mounted in said chamber at a point downstream from said first thermocouple; first valve means mounted in said first fuel line and adapted to vary the flow of fuel to said first burner; first controller means operatively connected to said first valve and adapted to open and close said first valve in response to the variance of the output signal from said first thermocouple from a first predetermined signal; second valve means mounted in said second fuel line and adapted to vary the flow of fuel to said second burner; and second controller means operatively connected to said second valve and adapted to open and close said second valve in response to the variance of the signal produced by said second thermocouple from a second predetermined signal.

18. A system in accordance with claim 17 wherein the first thermocouple is located about two-thirds of the length of the chamber from the inlet.

19. A system in accordance with claim 17 wherein the second thermocouple is located about four to five feet downstream from the first thermocouple.

References Cited
UNITED STATES PATENTS

| | | | |
|---|---|---|---|
| 3,171,639 | 3/1965 | McGregor et al. | 263—34 |
| 3,204,341 | 9/1965 | Whitsel | 34—39 |
| 3,219,329 | 11/1965 | Goins | 263—33 |
| 3,251,137 | 5/1966 | Alleman | 34—48 X |

KENNETH W. SPRAGUE, *Primary Examiner.*

UNITED STATES PATENT OFFICE
CERTIFICATE OF CORRECTION

Patent No. 3,350,790                          November 7, 1967

Travis S. Whitsel, Jr.

It is hereby certified that error appears in the above numbered patent requiring correction and that the said Letters Patent should read as corrected below.

Column 1, line 14, for "pallets" read -- pellets --; line 32, for "was" read -- has --; column 6, line 58, after "temperature" insert -- recorder --; column 8, line 3, for "paricle" read -- particle --; column 9, line 22, after "and", second occurrence, insert -- said --; column 10, line 16, after "said", first occurrence, insert -- second --.

Signed and sealed this 21st day of January 1969.

(SEAL)
Attest:

Edward M. Fletcher, Jr.                        EDWARD J. BRENNER

Attesting Officer                                 Commissioner of Patents